June 27, 1950 — H. A. YOUNGSTRAND — 2,513,075
LETTER OPENING MACHINE
Filed Oct. 15, 1946 — 2 Sheets-Sheet 1

Inventor
Hugo A. Youngstrand
By Clarence A. O'Brien and Harvey B. Jacobson
Attorneys

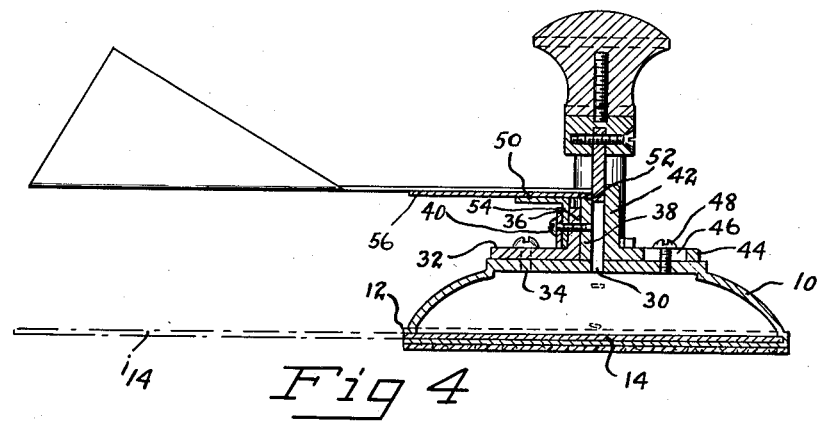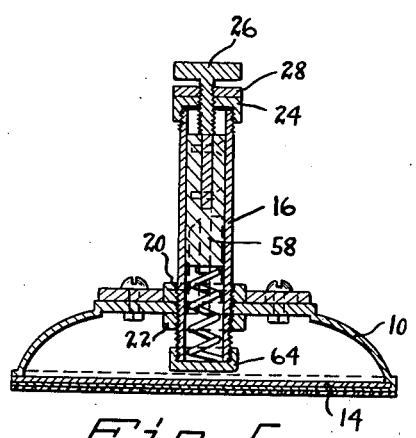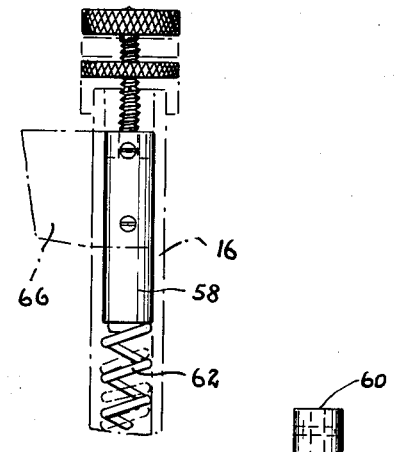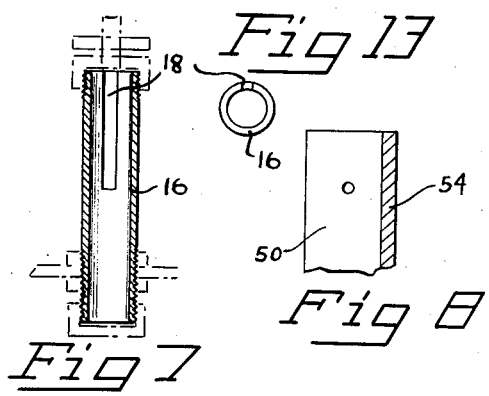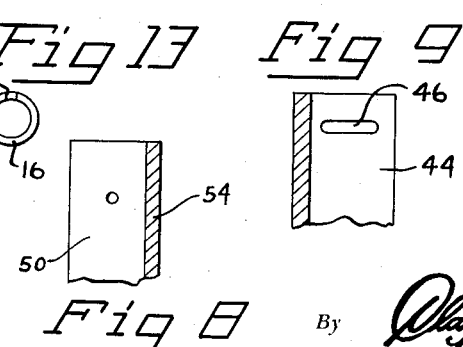

Patented June 27, 1950

2,513,075

UNITED STATES PATENT OFFICE 2,513,075

LETTER OPENING MACHINE

Hugo A. Youngstrand, Chicago, Ill.

Application October 15, 1946, Serial No. 703,342

6 Claims. (Cl. 164—47)

This invention pertains to novel and useful improvements in a letter opening machine and in general comprises an efficient cutting implement for severing the ends of letters in an efficient and expeditious manner.

The primary object of my invention is to provide a letter opening machine having an improved means for collecting and removing the severed ends of paper; which is provided with an improved and more efficient guiding means for the reciprocating knife thereof; which has provision for obtaining an adjustable stroke of the knife thereof; and wherein a more positive, and more efficient guiding means is provided for insuring the proper cooperative association between the knife blades.

Other ancillary objects of the invention reside in devising an apparatus in accordance with the foregoing objects, which is of compact, sturdy and simple construction, neat and ornamental in appearance, and which is extremely efficient in performing the functions desired.

These, together with numerous other objects of the invention which will later become apparent as the following description proceeds are attained by my invention, one embodiment of which has been illustrated, by way of example only, in the accompanying drawings, wherein:

Figure 4 is a vertical transverse sectional view taken substantially upon the line 4—4 of Figure 1;

Figure 5 is a transverse vertical sectional view taken substantially upon the line 5—5 of Figure 1;

Figure 6 is a detail view taken in vertical section and at right angles to Figure 5;

Figure 7 is a vertical sectional view taken through one of the standards of Figure 1;

Figure 8 is a fragmentary view partly in section of a detail;

Figure 9 is a fragmentary sectional view partly in detail of a portion of the adjustable guide;

Figure 10 is an elevation of one of the plungers forming a part of my invention;

Figure 13 is a top plan view of the standard as shown in Figure 7.

Figure 1:
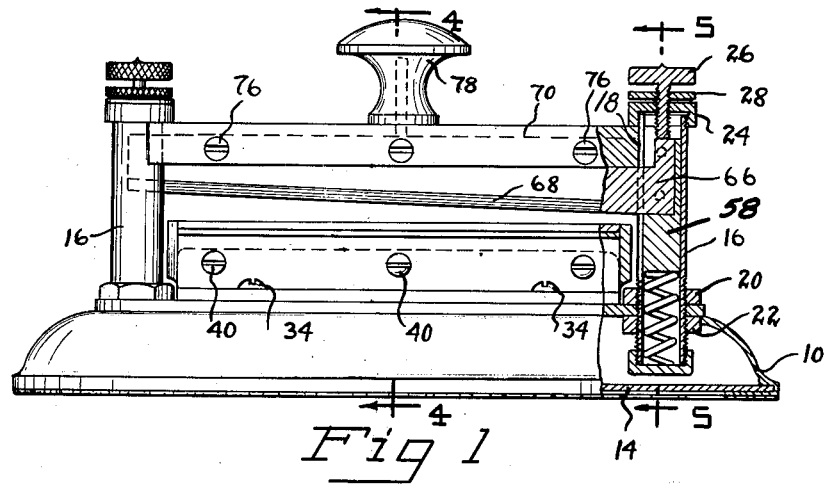
Figure 1 is front elevational view, parts being broken away, illustrating a preferred embodiment of the invention.
Figure 2:
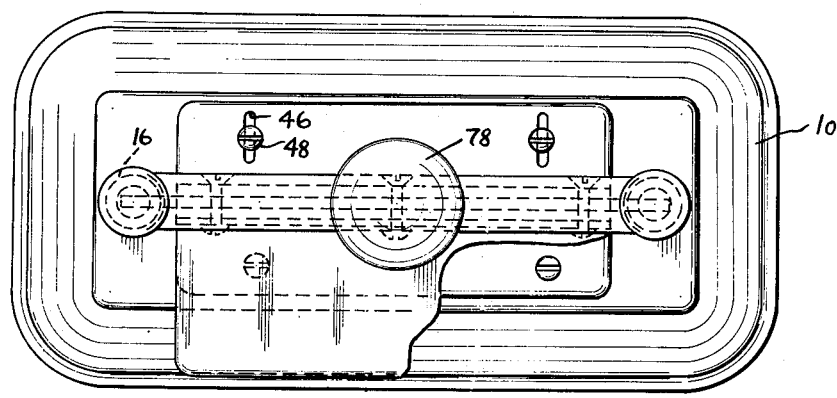
Figure 2 is a top plan view of the invention disclosed in Figure 1.
Figure 3:
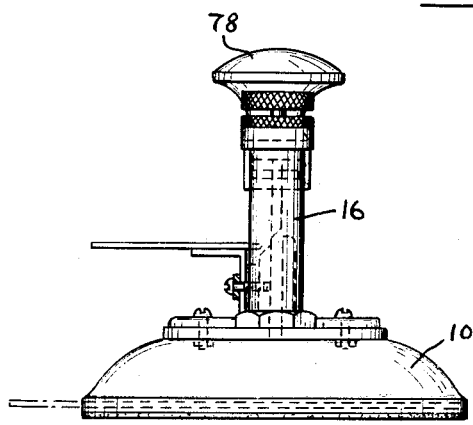
Figure 3 is an end elevational view of the device taken from the right of Figure 1.

In the accompanying drawings, numeral 10 designates a hollow base which may be of any suitable construction and is preferably sufficiently weighted to give stability to the device. As shown best in Figures 4 and 5, the hollow base is provided with a longitudinal slot 12 adapted to slidably receive a tray or the like 14, said base and tray constituting a receptacle for storing severed ends of letters or the like in a manner to be set forth hereinafter, the tray being shown in its extended position by dotted lines in Figure 4. Extending upwardly from the base 10 at suitably spaced points, are a pair of standards 16, consisting preferably of tubular members, externally screw threaded at both ends thereof. As shown best in Figures 7 and 13, the tubular members are axially slotted at one end thereof as at 18, for a purpose to be set forth hereinafter. The standards are affixed to the base by means of a pair of lock nuts 20 and 22 which are threaded upon the lower extremity of the tubular standard and adapted to embrace the upper surface, interiorly and exteriorly of the base 10. At its upper end, each standard is provided with an internally threaded cap 24 having an adjusting stud 26 axially disposed therethrough and provided with a locking nut 28 for securing the stud in any desired position of adjustments. Extending through the upper surface of the receptacle 10 and between the two tubular standards 16, is a transverse slot 30 adapted to permit the passage of waste paper into the receptacle as set forth hereinafter. Rigidly secured to the top surface of the receptacle 10 and adjacent the slot 30, is a bracket or support 32 rigidly and firmly attached to the base as at 34 and having a vertically extending flange 36 to which is rigidly attached the stationary knife blade 38 in a vertical position upon one edge of the slot 30. A plurality of screws or the like 40 provide means for detachably securing the stationary knife 38 to its support bracket 36. Parallel to the stationary knife 38 and disposed upon the opposite wall of the slot 30, is an angularly disposed guide member 42. The guide bracket 42 consists of a base portion 44 having a plurality of elongated slots 46 adapted to receive fastening screws 48. By means of the screws 48 and elongated slots 46, the guide bracket 42 may be adjusted upon the top of the base 10 in a manner to vary the spacing thereof relative to the stationary knife 38. The upper arm of a second flanged support bracket indicated at 50 is disposed in horizontal alinement with the knife edge 52 of the stationary knife 38 while the downwardly extending flange or leg 54 thereof is secured to the bracket 36 by means of the fastening screws 40. Supported in any desired manner upon the horizontal flange 50 is a platform or shelf 56 adapted to support and guide a letter or other paper object, as the latter is passed across the knife edge 52 for severing by means of the reciprocating blade to be now described.

Figures 11, 12:
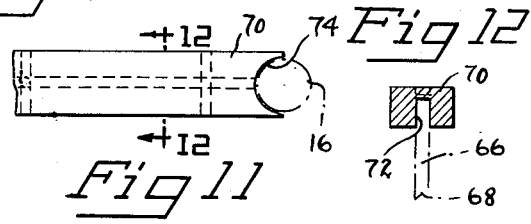
Figure 11 is a fragmentary top plan view of a portion of the reciprocating blade.
Figure 12 is a transverse sectional view taken substantially upon the section line 12—12 of Figure 11.

As shown best in Figures 1, 5 and 6, a tubular plunger 58 is slidably received in each of the tubular standards 16, said plunger being axially slotted as at 60 at one end thereof. A coil spring 62 disposed below the plunger 58 is seated upon the surface of a cap 64 constituting a closure for the lower end of the tubular standards. A laterally disposed knife blade 66 has its extremities extending through the slots 18 and into the bifurcations 60 of the plungers 58 and are rigidly secured to said plungers by any suitable means. The lower surface of the knife blade is provided with a beveled cutting edge 68 which as shown in Figure 1, is inclined downwardly from one standard to the other. The upper edge of the knife blade 66 is received in a transversely extending channel 72 of a U-shaped member 70 which constitutes both a reinforcing or stiffening member for the knife blade and also functions as a guide during vertical reciprocation of the blade. As shown more clearly in Figure 11 the extremities of the channel or guide members 70 are concavely curved as at 74 in order to snugly engage and conform to the curvature of the tubular standard 16. The U-shaped member 70 is secured to the reciprocating knife blade as by any suitable fastening means indicated at 76. A handle member indicated at 78 is attached in any desired or convenient manner to the upper surface of the channel member and the reciprocating blade.

From the foregoing description it is believed that the operation of the invention will be readily understood. The springs 62 urge the reciprocating knife blade into its raised or elevated position as indicated in Figure 1. A letter or any other paper object is now disposed upon the supporting shelf 56 and is slid thereon until a desired portion thereof is positioned beneath the cutting edge 68 of the knife 66. The handle 78 is now depressed, causing the blade 66 to descend against the opposition of the springs 62 until the cutting edge 68 in cooperation with the stationary edge 52 severs the article at the desired point, the upper blade now descending in guided relation, between the stationary blade 38 and the parallel guide means 42. It will be noted that any portion severed by the descending knife, will drop through the slot 30 into the receptacle in the base 10, where it may be removed at any desired interval by sliding the tray 14 therefrom. During the vertical reciprocation of the blade 66, the channel members 70 travel vertically and in guided relation upon the upstanding tubular member 16, the cooperating curved surfaces 74 engaging the tubular post and guiding the knife in its travel. As a further means of guiding the knife, the extremities of the blade 66 slide in the vertical or axial slots 18 of the tubular post and also are securely and rigidly attached in the bifurcation 60 of the plungers 58 which constitute an additional piston guiding means. The upward travel of the knife may be limited to any desired extent by proper adjustment of the stud 26 and the lock nut 28, the lower end of the stud constituting an abutment or stop to restrict the upward travel of the knife by engaging the upper surface of the blade as the latter reciprocates within the tubular guide 16.

It will be noted by reference to Figure 4, that the guide member 42 extends vertically higher than the edge 52 of the stationary knife 38, and thereby serves to prevent lateral displacement of the upper blade relative to the lower blade, and any wear developing at this point may be compensated for by proper adjustment of the screws 48 in the slots 46.

Since it will be evident that the principles of this invention may be practiced in a variety of constructions, I do not limit myself to the exact arrangement shown but may avail myself of any suitable modification falling within the scope of the appended claims.

I claim as my invention:

1. In a letter opener, a base, a pair of standards secured to said base, a stationary knife blade secured to said base, a reciprocable knife blade cooperating with said stationary blade and guided for reciprocating movement by said standards and resilient means urging said reciprocating blade away from said stationary blade, said standards being tubular, a spring pressed plunger vertically slidable axially in each standard, said reciprocating blade being attached at each end to one of said plungers and adjustable stop means carried by said tubular standards for limiting movement of said reciprocating blade.

2. In a letter opener, a base, a pair of tubular standards mounted on said base having removable closure caps on their upper ends, plungers reciprocable in each standard, parallel longitudinal slots, one in each standard, a reciprocating knife blade having its ends extending through said slots for guided vertical movement therein, means detachably securing said knife ends to said plungers and springs in said standards urging said plungers and said knife blade to their upper position.

3. In a letter opener, a base, a pair of tubular standards mounted on said base having removable closure caps on their upper ends, plungers reciprocable in each standard, parallel longitudinal slots, one in each standard, a reciprocating knife blade having its ends extending through said slots for guided vertical movement therein, means detachably securing said knife ends to said plungers and springs in said standards urging said plungers and said knife blade to their upper position, each of said closure caps having an abutment depending therefrom into said standard for limiting the upward movement of said knife blade and said plungers.

4. In a letter opener, a base, a pair of tubular standards mounted on said base having removable closure caps on their upper ends, plungers reciprocable in each standard, parallel longitudinal slots, one in each standard, a reciprocating knife blade having its ends extending through said slots for guided vertical movement therein, means detachably securing said knife ends to said plungers and springs in said standards urging said plungers and said knife blade to their upper position, each of said closure caps having an abutment depending therefrom into said standard for limiting the upward movement of said knife blade and said plungers, said abutment comprising an adjusting screw carried by and extending through the cap.

5. In a letter opener, a base, a pair of tubular standards mounted on said base having removable closure caps on their upper ends, plungers reciprocable in each standard, parallel longitudinal slots, one in each standard, a reciprocating knife blade having its ends extending through said slots for guided vertical movement therein, means detachably securing said knife ends to said plungers and springs in said standards urging said plungers and said knife blade to their upper position, said base being hollow and said standards having their lower ends extending into said base and means engaging the lower ends of said standards and said base for vertically adjusting said standard relative to said base.

6. In a letter opener, a base, a pair of tubular standards mounted on said base having removable closure caps on their upper ends, plungers reciprocable in each standard, parallel longitudinal slots, one in each standard, a reciprocating knife blade having its ends extending through said slots for guided vertical movement therein, means detachably securing said knife ends to said plungers and springs in said standards urging said plungers and said knife blade to their upper position, said knife blade having guide portions slidingly engaging the exterior surface of said standards.

HUGO A. YOUNGSTRAND.

REFERENCES CITED

The following references are of record in the file of this patent:

UNITED STATES PATENTS

| Number | Name | Date |
| --- | --- | --- |
| 65,095 | Lee | May 28, 1867 |
| 388,872 | Holmes | Sept. 4, 1888 |
| 606,261 | Yates | June 28, 1898 |
| 766,388 | Robertson | Aug. 2, 1904 |
| 929,233 | Mason | July 27, 1909 |